United States Patent
Magnaghi et al.

(10) Patent No.: US 7,385,931 B2
(45) Date of Patent: Jun. 10, 2008

(54) DETECTION OF NETWORK MISCONFIGURATIONS

(75) Inventors: Antonio Magnaghi, Sunnyvale, CA (US); Jingsha He, Plano, TX (US); Takafumi Chujo, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 971 days.

(21) Appl. No.: 10/646,565

(22) Filed: Aug. 22, 2003

(65) Prior Publication Data

US 2005/0044443 A1 Feb. 24, 2005

(51) Int. Cl.
*G01R 31/08* (2006.01)

(52) U.S. Cl. .................. 370/248; 370/249; 370/218; 370/244

(58) Field of Classification Search ............... 370/249, 370/218, 244, 352, 236.1, 236, 236.2, 466, 370/401, 248, 400; 714/712–717; 709/224, 709/233; 379/221.06, 244, 27.01, 1.01–1.04, 379/2, 3, 26.01, 221.03, 221.04, 221.05
See application file for complete search history.

(56) References Cited

U.S. PATENT DOCUMENTS

| | | | | |
|---|---|---|---|---|
| 5,477,531 A | * | 12/1995 | McKee et al. | 370/249 |
| 6,002,671 A | * | 12/1999 | Kahkoska et al. | 370/248 |
| 6,215,774 B1 | * | 4/2001 | Knauerhase et al. | 370/252 |
| 6,741,555 B1 | * | 5/2004 | Li et al. | 370/229 |
| 6,965,572 B1 | * | 11/2005 | Boodaghians | 370/249 |
| 7,012,893 B2 | * | 3/2006 | Bahadiroglu | 370/231 |
| 2001/0056503 A1 | * | 12/2001 | Hibbard | 709/250 |

OTHER PUBLICATIONS

J. Postel, RFC-792 Internet Control Message Protocol, Sep. 1981, Network Working Group, entire document.*
Gaurav Banga, "*Auto-Diagnosis of Field Problems in an Appliance Operating System*," Proceedings of 2000 USENIX Annual Technical Conference, San Diego, CA, Jun. 18-23, 2000, © 2000 by The USENIX Association.
Stefan Savage, "*Sting: a TCP-based Network Measurement Tool*" Department of Computer Science and Engineering, University of Washington, Seattle, unknown.
Perils of the Network, A Series on Network Idiosyncrasies and Degradations, Duplex Conflicts, How a Duplex Mismatch Can Cripple a Network. *Jaalam Technologies*. Aug. 20, 2003.
Cisco Systems, User Guide for Campus Manager, Software Release 3.2, *CiscoWorks2000*.
Configuring and Troubleshooting Ethernet 10/100Mb Half/Full Duplex Auto-Negotiation. Updated Aug. 9, 2002.

* cited by examiner

*Primary Examiner*—Doris H. To
*Assistant Examiner*—Ian N. Moore
(74) *Attorney, Agent, or Firm*—Baker Botts L.L.P.

(57) ABSTRACT

A system includes a communication network having any number of separately addressable elements. An analysis device can test packet data paths between these elements by eliciting particular traffic patterns. For example, the analysis device may elicit similar traffic patterns in both forward and reverse communications with a remote element and analyze these communications to detect network misconfigurations.

41 Claims, 2 Drawing Sheets

DETECTION OF NETWORK MISCONFIGURATIONS

TECHNICAL FIELD OF THE INVENTION

The present invention relates generally to network management and, more particularly, to detection of network misconfigurations.

BACKGROUND OF THE INVENTION

Network configurations can dramatically impact transmission capabilities. For example, in "Ethernet" networks, each network segment should be configured such that all connected devices use a common Ethernet access mechanism. In these systems, misconfigured devices can cause traffic disruptions, such as loss of packets.

SUMMARY OF THE INVENTION

In accordance with the present invention, techniques for detection of network misconfigurations are provided. According to particular embodiments, the system provides techniques for detecting duplexity mismatches.

According to a particular embodiment, a method for detecting network misconfigurations identifies a remote target, transmits a forward packet series on a data path to the remote target, and receives at least some packets from a reverse packet series transmitted on the data path from the remote target. The method determines forward path performance characteristics for transmission of the forward packet series and determines reverse path performance characteristics for transmission of the reverse packet series. The method also, if the forward path performance characteristics and the reverse path performance characteristics indicate asymmetry of the data path, generates an alert signaling a potential network misconfiguration of the data path.

Embodiments of the invention provide various technical advantages. Particular embodiments provide analysis tools to identify misconfigurations that may cause performance degradations, such as packet losses and reduced throughput. According to particular embodiments, analysis tools use standard protocols for diagnosis and need not rely on proprietary techniques. This allows, for example, analysis of a complete network path without regard to the manufacturers of individual components along the path. According to particular embodiments, these techniques may also enable diagnosis of network paths through active devices, such as analysis of links behind network address translation (NAT) devices.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
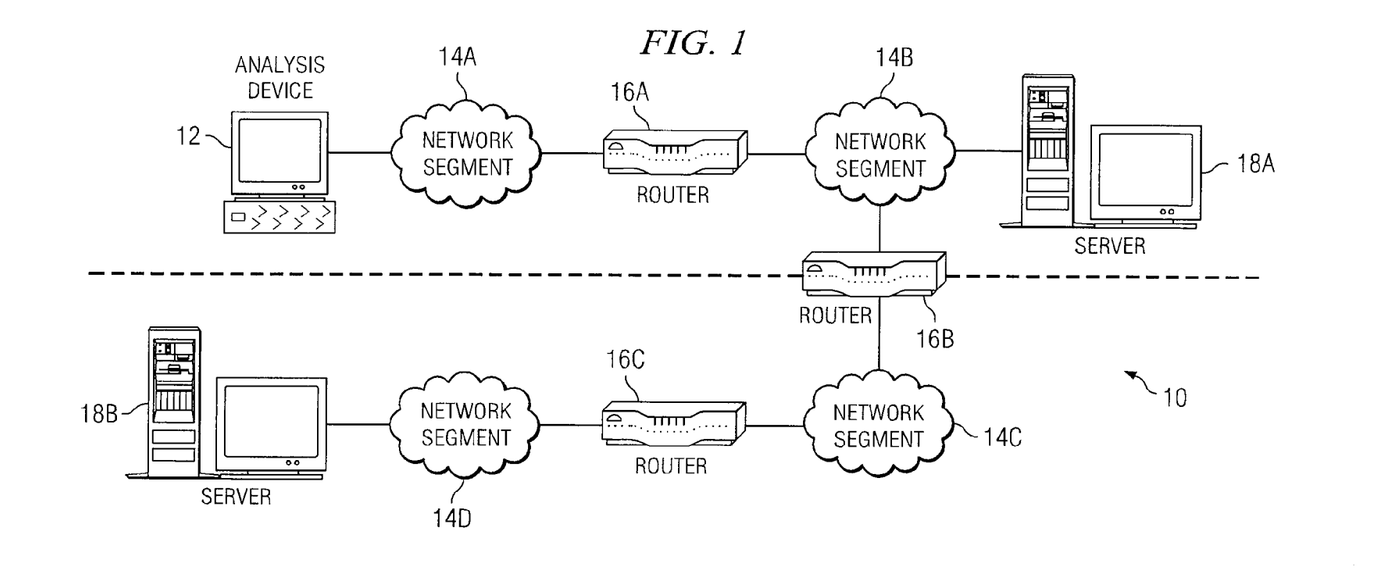
FIG. 1 illustrates a communication system that includes an analysis device for diagnosing network misconfigurations in accordance with particular embodiments of the present invention.

FIG. 1 illustrates a communication system, indicated generally at 10, that includes an analysis device 12, multiple network segments 14, multiple routers 16, and multiple servers 18. In general, analysis device 12 provides analysis of network traffic to diagnose misconfigurations within system 10. More specifically, analysis device 12 may enable detection of duplexity mismatches between linked devices within system 10. According to particular embodiments, analysis device 12 transmits and receives patterns of packets and can diagnose network misconfigurations by analyzing characteristics of these communications.

Analysis device 12 represents any suitable network equipment, including appropriate controlling logic, capable of coupling to other elements and communicating using packet based standards. For example, analysis device 12 may be a general purpose computer, a router, a specially designed component, or other suitable network equipment. Analysis device 12 provides for analysis of network traffic to diagnose potential network misconfigurations.

Similar to analysis device 12, each server 18 represents network equipment, including any appropriate controlling logic, for coupling to other network equipment and communicating using packet based communication protocols to provide various services. Servers 18 may, for example, provide network accessible services for other elements within system 10. These services could include any number of features, such as web hosting, data management, processing, or other suitable services. In certain circumstances, one or more servers 18 may support diagnosis functions similar to those provided by analysis device 12, or for cooperation with the diagnosis performed by analysis device 12.

In the embodiment illustrated, analysis device 12 and servers 18 are interconnected by communications equipment that includes network segments 14 and routers 16. Each network segment 14 represents any suitable collection and arrangement of components and transmission media supporting packet based communications. For example, a specific network segment 14 may include any number of switches, hubs, or repeaters interconnected to form an Ethernet subnet. Routers 16 permit network traffic to flow between network segments 14. For example, each router 16 may support layer three routing of packets.

In the embodiment illustrated, there are four network segments 14, labeled 14a, 14b, 14c, and 14d. There are three routers 16, labeled 16a, 16b, and 16c. Also, there are two servers 18, labeled 18a and 18b. In this illustration, analysis device 12, network segments 14a and 14b, router 16a, and server 18a are shown as separated from network segments 14d and 14c, router 16c, and server 18b by way of router 16b. According to particular embodiments, router 16b may support active modification of traffic passing between these two zones. For example, router 16b may provide for network address translation services. This particular configuration will be used below to show operation and advantages of particular embodiments.

According to particular embodiments, components within system 10 communicate packets using "Ethernet standards." The use of the term packet, however, should be understood to contemplate any suitable segmentation of data, such as packets, frames, or cells. Moreover, use of the term "Ethernet" or "Ethernet standards" should be understood to encompass communication protocols that have been developed to handle transmission of packets between components, including any extensions, add-ons, and/or future developments that may occur with respect to these protocols. For example, Ethernet standards encompass the protocols set forth within the IEEE-802.3 and 802.3x standards.

The Ethernet standards generally define two different protocols for media access control (MAC). In the case of a shared communication medium, Ethernet transmissions are regulated by a "carrier sense multiple access with collision detection" (CSMA/CD) protocol, as defined by the IEEE-802.3 standard. In the case of a dedicated, point-to-point channel, Ethernet communication is defined by the IEEE-802.3x standard. These two distinct media access control schemes are referred to as half duplex and full duplex, respectively.

In certain circumstances, network links between adjacent network devices may be characterized by Ethernet duplexity mismatches. That is, two adjacent network devices, each connected to the same physical communication medium, may operate according to incompatible media access control schemes. For example, one of the devices may operate in half duplex mode, while the other device operates in full duplex mode. This mismatch may cause packet loss on the link. Moreover, the disruption of traffic on the link may cause a ripple effect that affects higher level network layers.

Analysis device 12 analyzes network traffic to potentially diagnose network misconfigurations, such as Ethernet duplexity mismatches. To identify network misconfigurations, analysis device 12 exploits the symmetric characteristics of Ethernet data paths. Ethernet data paths are not intrinsically asymmetric with respect to directional performance metrics. For instance, under normal conditions, bottleneck bandwidth in an Ethernet network is the same for both forward and reverse transmissions. For example, packet loss in both forward and reverse directions will typically be comparable. Similarly, other performance characteristics, such as throughput, will typically be comparable in forward and reverse directions. Network misconfigurations can, however, introduce path asymmetry on misconfigured links within a communication path. This asymmetry may arise only under certain conditions. According to particular embodiments, analysis device 12 uses techniques to generate conditions that will expose asymmetries caused by network misconfigurations.

According to particular embodiments, analysis device 12 attempts to generate a similar traffic pattern in both forward and reverse direction. For ease of understanding, the following discussion will describe transmissions from analysis device 12 as traveling in the forward direction and packets received by analysis device 12 as traveling in the reverse direction. However, it should be understood that these terms are used merely for convenience, and the terms forward and reverse directions do not necessarily indicate any required directionalities. With symmetric disturbances, forward and reverse traffic will be similarly affected. However, for asymmetric disturbances, forward and reverse traffic will be disproportionately affected. Therefore, analysis device 12 can use forward and reverse performance measurements to identify path asymmetry. Under proper traffic conditions, duplexity mismatch in a network data path will result in strong asymmetric properties. In particular, forward and reverse performance characteristics, such as path loss rates or throughput, may be significantly different.

According to particular embodiments, analysis device 12 generates traffic patterns on a data path that are tailored to elicit strong asymmetric behavior. Analysis device 12 can, for example, transmit a series of packet bursts, with each packet burst having some number of packets each separated by a time constant. To help elicit asymmetric behavior, each packet may be relatively small. According to particular embodiments, each packet is 512 bits. This sizing at 512 bits can enhance asymmetric characteristics, since half duplex components will not experience late collisions (collisions after a specified collision window). To ensure that acknowledgments from the remote target are similarly sized, analysis device 12 may configure the TCP connection to use no TCP or Internet protocol (IP) options (such as time stamps or selective acknowledgments). However, while this particular embodiment describes packets having a particular size, the traffic pattern generated by analysis device 12 may include any number of appropriately spaced packets having any suitable size or sizes.

To enable detection of asymmetric behavior, analysis device 12 attempts to ensure that similar traffic patterns exist on both forward and reverse paths. In certain embodiments, analysis device 12 uses explicit cooperation with a target device to generate similar traffic patterns in both forward and reverse directions. For example, consider both analysis device 12 and server 18a appropriately enabled for path diagnosis. Analysis device 12 may contact server 18a and request analysis of the connecting data path by, for example, transmitting a test request message. Analysis device 12 and server 18a then transmit similar traffic patterns designed to bring out asymmetric behavior of the data path. Analysis device 12 and server 18a may, for example, each transmit a series of packet bursts to each other.

According to other embodiments, analysis device 12 may elicit cooperation of a remote device to ensure similar traffic in both forward and reverse directions. Analysis device 12 can generate this traffic pattern by exploiting standard features of communication protocols. For example, consider analysis device 12 and a remote target, such as router 16b, using transmission control protocol (TCP) communications. During a TCP session, router 16b will send acknowledgments in response to receiving packets from analysis device 12. However, router 16b may attempt to bundle acknowledgments, such that a single acknowledgment implies receipt of multiple packets. To prevent this bundling of acknowledgments, analysis device 12 may use non-sequential TCP sequence numbers in successive packets. Router 16b then, operating according to standard TCP protocols, will acknowledge each received packet. Thus the traffic pattern from analysis device 12 may elicit a similar traffic pattern of acknowledgments from router 16b. This operation does not require the target remote device to include any specialized features for cooperating with analysis device 12.

When using TCP sessions, analysis device 12 can potentially test for network misconfigurations on data paths spanning active devices. Thus, for example, analysis device 12 may establish a TCP session with server 18b that spans across router 16b and use the session as detailed above. However, for data paths that do not span active devices, analysis device 12 may use other protocols, such as Internet control message protocol (ICMP). When using ICMP, analysis device 12 can transmit ICMP echo/reply messages to a remote target to generate similar traffic patterns in the forward and reverse directions. Thus, system 10 contemplates analysis device 12 using various protocols and/or techniques depending upon characteristics of network paths to be tested. However, while this description provides examples of different potential protocols and techniques for generating appropriate traffic patterns, system 10 contemplates analysis device 12 using any suitable techniques and protocols to create these traffic conditions.

To measure asymmetry, analysis device 12 attempts to discover packet loss in both forward and reverse directions. Disparities in these packet loss rates can highlight asymmetric properties and potentially can indicate duplexity mismatch along at least one link in a data path. When cooperating with the remote target, analysis device 12 may use communication to discover the forward and reverse packet loss rates. Consider the example of analysis device 12 cooperating explicitly with server 18a to analyze a data path. After transmitting test patterns, analysis device 12 and server 18a can exchange information, such as the number of packets sent and received, such that analysis device 12 may determine forward and reverse direction packet loss rates.

However, if analysis device 12 attempts merely to elicit unwitting cooperation from a remote target, analysis device 12 may perform other tasks to determine forward and reverse packet loss rates. According to particular embodiments, analysis device 12 uses a pre-testing and post-testing technique to determine the number of packets communicated by a remote target during a data path test. During the pre-test and post-test operations, analysis device 12 attempts to identify particular characteristics of received packets to determine by implication the number of packets communicated by the remote target. Once this number is known, analysis device 12 can compare the number of packets sent by the remote target with the number of packets received from the remote target to determine packet loss in the reverse direction. Moreover, because analysis device 12 uses techniques to ensure responsive packets to each packet received by the remote target, analysis device 12 can use the number of packets sent by the remote target to also determine the packet loss in the forward direction.

According to particular embodiments, analysis device 12 uses standard features of IP communications during pre-testing and post-testing operations to discover the number of packets sent by a remote target during testing. According to these embodiments, analysis device 12 uses IP identification numbers (IPIDs) to track the number of packets communicated by a remote target during testing. While the IP standards do not require consecutive IPIDs, most standard communications equipment generates consecutive IPIDs due to the simplicity of this operation. Thus during pre-testing, analysis device 12 attempts to determine an initial IPID to expect during testing. To determine this IPID, analysis device 12 communicates a packet to a remote target and waits for an acknowledgment. Analysis device 12 may continue to re-send the packet until an acknowledgment is received. Once an acknowledgment is received from the remote target, analysis device 12 can determine a starting IPID number from the received acknowledgement. Analysis device 12 may then proceed to testing as described above. For example, analysis device 12 may communicate a series of packet bursts designed to similar traffic shapes in both forward and reverse directions by eliciting acknowledgments from the remote target.

After the testing phase, analysis device 12 may use a post-test operation to determine a final IPID number from the remote target. Analysis device 12 may use a procedure similar to that discussed above with respect to the pre-test operation. For example, analysis device 12 may communicate a packet and monitor for an acknowledgment to the packet (and so long as an acknowledgment is not timely received, may re-send that packet). From the acknowledgment, analysis device 12 can determine a final IPID number. So long as the remote target has used consecutive IPID numbers, analysis device 12 can now determine the number of responsive acknowledgments communicated during the testing phase. As previously noted, this number allows analysis device 12 to determine both forward and reverse packet loss rates.

After determining the forward and reverse packet loss rates (or other appropriate path characteristics), analysis device 12 can compare these rates to identify asymmetry along a data path. In many cases, duplexity mismatch will result in markedly different packet loss rates in the forward and reverse directions. Thus packet loss rates may, for example, display packet loss rates that differ by 10%, 20%, 30%, or more. To determine whether asymmetry exists, analysis device 12 may therefore compare the difference in the two packet loss rates against some threshold.

In certain circumstances, the use of a single measurement cycle for reverse and forward characteristics may result in a misdiagnosis for the data path under scrutiny. For example, the use of a single measurement for forward and reverse packet sequences may generate a false positive or a false negative. To reduce occurrences of misdiagnosis, particular embodiments employ a sampling process in which analysis device 12 aggregates multiple measurements into a sample, and then analyzes the sample to determine whether or not a misconfiguration is apparent.

According to particular embodiments, analysis device 12 performs a series of "probing experiments" of a data path to determine multiple measurements of path characteristics, such as forward a reverse packet loss rates. Analysis device 12 may then aggregate the results of the multiple repetitions into a sample. In certain embodiments, analysis device 12 processing the measurements in a sample to calculate a misconfiguration index that expresses the likelihood of misconfiguration along the path under investigation. The following description briefly introduces mathematical formulas used by particular embodiments for processing a sample. For this processing, $(L_{FWj}, L_{RVj})$ represents the one-way loss rates along the forward and reverse path, respectively, in the j-th measurement of a sample. S is a sample comprising n measurements:

$$S=(L_{FW,1}, L_{RV,1}, L_{FW,2}, L_{RV,2}, \ldots, L_{FW,n}, L_{RV,n}).$$

The ASymmetry index for the j-th measurement, $AS_j$, is:

$$AS_j = \begin{cases} +1, & \text{if}(L_{RV,j} \geq \alpha L_{FW,j} + \beta) \\ -1, & \text{if}(L_{FW,j} \geq \alpha L_{RV,j} + \beta) \\ 0, & \text{otherwise} \end{cases} \quad (1)$$

$\alpha$, and $\beta$ are two positive constants. $|AS_j|$ is a binary function of the j-th measurement. If its value is not null, the loss rate measurement (and the associated path) is regarded as asymmetric. This is a symptom of a possible misconfiguration, such as a duplexity mismatch. Analysis device 12 may distinguish between the case in which the reverse path exhibits high packet loss rate ($AS_j$ is positive) vs. the case in which the forward path experiences high loss rate ($AS_j$ is negative). Analysis device 12 may use the sign information of $AS_j$ is used to convey additional diagnosis information. The Degree of Asymmetry ($DA_j$) of the j-th measurement is:

$$DA_j=|L_{FW,j}-L_{RV,j}|$$

Let W(S) be:

$$W(S) = \frac{1}{n}\sum_{j=1}^{n}(AS_j)(DA_j)$$

W(S) is the average, over the n-sample S, of only those measurements that are asymmetric ($AS_j$ is not null). W(S) provides an aggregated index summarizing the end-to-end behavior, with respect to asymmetry, of the path under investigation. Based on W(S) analysis device 12 may define for a sample S an index (Misconfiguration Index: MI(S)) that quantifies the expectation of a misconfiguration. In general, higher W(S) values typically correspond to measurement samples that provide strong evidence of a misconfiguration. An example misconfiguration index:

$$MI(S) = 100\left(1 - e^{-\frac{(W(S))^2}{\gamma}}\right)\text{sign}(W(S))$$

(In this relationship expression, $\gamma$ is a positive constant.) Among alternative relationships between MI(S) and W(S), a super-linear functional dependency models the fact that linearly increasing values of W(S) denote an expectation of misconfiguration increasing more than linearly. This may be justified since network performance often degrades extremely fast (super-linearly) with increasing packet loss rates.

The preceding description provides detailed mathematical formulas for statistical processing of data sample. However, as noted above, system 10 contemplate analysis device 12 using any appropriate techniques and calculations for measuring characteristics and detecting potential misconfigurations. Regardless of the techniques used, once asymmetry is detected, analysis device 12 can report the network misconfiguration and/or perform additional tests to further isolate the location of the network misconfiguration.

According to particular embodiments, analysis device 12 may, upon detecting asymmetry, perform additional analysis to isolate the location of network misconfiguration. For example, consider analysis device 12 detecting a network misconfiguration on a data path with server 18a. This error may result from a misconfiguration within the path between analysis device 12 and router 16a or on the path between router 16a and server 18a. To isolate which segment of the data path contains the network misconfiguration, analysis device 12 may perform multiple testing operations to isolate the misconfigured segment. Thus analysis device 12 may first analyze the total path to server 18a and, upon detecting network misconfiguration, may analyze the path segment up to router 16a. Analysis device 12 may then report whether the network misconfiguration exists before or after router 16a on the data path.

Moreover, analysis device 12 may use other techniques to help isolate network misconfigurations. For example, analysis device 12 may use spatial correlation, based on the results from multiple different tests to pinpoint a misconfiguration. Consider analysis device 12 probing two different targets simultaneously. This provides two end-to-end paths. In many cases, these two paths may share part of their physical links. In these cases, misconfiguration location can be improved by exploiting that additional information. For instance, if traffic anomalies are detected only along one path, then the misconfiguration point is likely not shared between the two paths. Thus analysis device 12 can focus testing on the links not shared by both paths. Also, while this provides a particular use of spatial correlation, analysis device 12 may use spatial correlation in other ways to help to improve misconfiguration location.

In addition to isolating a particular segment which may be misconfigured, analysis device 12 may further determine the direction of the misconfiguration. For example, by determining which direction experiences a higher packet loss rate, analysis device 12 may potentially determine whether the misconfiguration occurs in the forward or reverse direction.

Also, while these techniques lend themselves well to detecting network misconfigurations, analysis device 12 may use the results of its analysis to diagnose other network problem. For example, high packet loss rates, even if symmetric, can indicate poor network health. Therefore, system 10 contemplates analysis device 12 reporting any number of suitable network errors.

Figure 2:
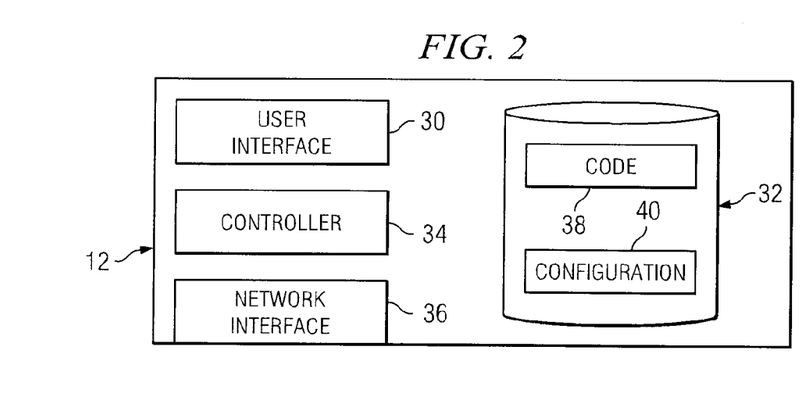
FIG. 2 is a block diagram illustrating exemplary functional components for the analysis device.

FIG. 2 is a block diagram illustrating exemplary functional elements for analysis device 12. In the embodiment illustrated, analysis device 12 includes a user interface 30, a memory 32, a controller 34, and a network interface 36. In general, analysis device 12, as previously discussed, provides for the analysis of network data paths to identify network misconfigurations. More specifically, analysis device 12 may generate traffic patterns to elicit asymmetric behavior of data paths in order to identify network misconfigurations.

User interface 30 provides for interactions with users of analysis device 12. For example, user interface 50 may include a display, keyboard, keypad, mouse, and/or other suitable elements for presenting information to and receiving input from users. Memory 32 provides for storage of information for use by analysis device 12. In the embodiment illustrated, memory 32 includes code 38 and configuration information 40. Code 38 includes software, source code, and/or other appropriate controlling logic for use by elements of analysis device 12. For example, code 38 may include logic implementing some or all operations for analyzing a data path. Configuration information 40 includes start-up, operating, and other suitable settings and configurations for use by analysis device 12. For example, configuration information 40 may identify IP addresses of remote targets, user settings, thresholds, and/or other suitable information for use during operation.

Network interface 36 supports packet based communications with other network equipment. For example, network interface 36 may support the transmission and receipt of packets using any appropriate communication protocols. Controller 34 controls the management and operation of analysis device 12. For example, controller 34 may include one or more microprocessors, programmed logic devices, or other suitable elements executing code 38 to control the operation of analysis device 12.

During operation, the elements of analysis device 12 operate to analyze data paths within system 10 to identify network misconfigurations. For example, controller 34 may execute code 38 based upon configuration information 40 to control the operation of network interface 36. Controller 34 may then analyze communications between network interface 36 and a remote target to identify potential misconfigurations along a data path. Upon detecting misconfigurations, controller 34 may alert a user using user interface 30. Thus the particular embodiment illustrated provides example modules for implementing broad functionality within analysis device 12.

However, while the embodiment illustrated and the preceding description focus on a particular embodiment of analysis device 12 that includes specific elements, system 10 contemplates analysis device 12 having any suitable combination and arrangement of elements for providing analysis of packet based data paths. Thus the modules and functionalities described may be combined, separated, or otherwise distributed among any suitable functional components. Moreover, while shown as including specific functional elements, system 10 contemplates analysis device 12 implementing some or all of its functionality using logic encoded in media, such as software or programmed logic devices. Additionally, while shown as a dedicated analysis device 12, system 10 contemplates the analysis functionality of device 12 being implemented by any suitable components within system 10. Thus, for example, elements such as routers 16 or servers 18 may implement various network analysis functions as described with respect to analysis device 12.

Figure 3:
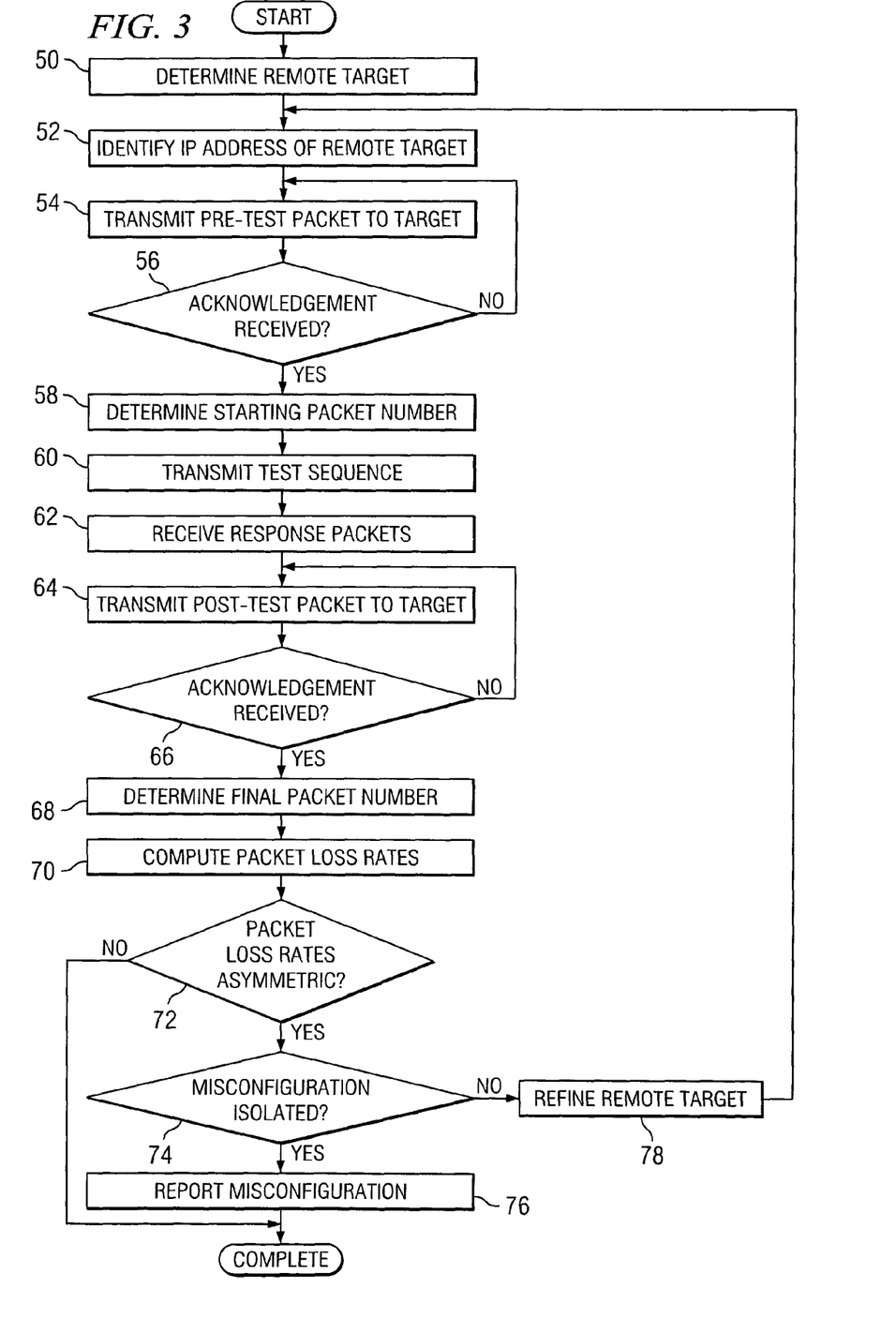
FIG. 3 is a flowchart illustrating a method for diagnosing a network path to identify potential network misconfigurations.

FIG. 3 is a flowchart illustrating a method for analyzing a data path to potentially identify network misconfiguration. As previously noted, system 10 contemplates elements using various techniques to elicit express or implied cooperation from remote targets during a test. The following method, however, will focus only on a particular embodiment and the operation of analysis device 12. Analysis device 12 determines a remote target at step 50 and identifies an IP address of the remote target at step 52. For example, through user interface 30, a user may indicate a remote target for testing. Additionally or alternatively, analysis device 12 may use automated techniques to determine a remote target. For example, analysis device 12 may scan through and test any number of remote targets.

Once a remote target is identified, analysis device 12 may perform pre-test operations to discover information such as a starting IPID number. Thus in the embodiment illustrated, analysis device 12 transmits a pre-test packet to the remote target at step 54 and determines whether an acknowledgment of this packet has been received at step 56. If an acknowledgment has not been received during some expected period of time, analysis device 12 may retransmit the pre-test packet to the target at step 54. Thus as illustrated, analysis device 12 may continue to retransmit the pre-test packet until an acknowledgment is received.

After receiving an acknowledgment, analysis device 12 determines the starting packet number at step 58. For example, analysis device 12 may examine the IPID number of the received acknowledgment. Analysis device 12 then transmits a test sequence at step 60. For example, as previously discussed, analysis device 12 may transmit a series of packet bursts each separated by some time constant, with each packet burst containing one or more packets again separated by a second time constant. Also, as previously discussed, analysis device 12 may form these packets in relatively small sizes, such as approximately 512 bits each, in order to elicit strong asymmetric behavior of a data path. Moreover, analysis device 12 may use characteristics of communication protocols to ensure an acknowledgment from the remote target for any received packet. For example, as previously discussed, analysis device 12 may use non-sequential TCP sequence numbers, ICMP echo/reply messages, or other suitable standard operations to ensure responses from the remote target for each packet received. During and/or after transmitting the test sequence, analysis device 12 receives responsive packets at step 62.

After the testing, analysis device 12 may transmit a post-test packet to the target at step 64 and monitor for an acknowledgment at step 66. As with the pre-test operations, analysis device 12 may continue to re-transmit the post-test packet to the remote target until an acknowledgment has been received. Based on the received acknowledgment, analysis device 12 may determine a final packet number at step 68. For example, analysis device 12 may examine the IPID number from the acknowledgment.

Analysis device 12 computes the packet loss rates of the forward and reverse directions at step 70. According to particular embodiments, analysis device 12 performs this calculation using the number of packets communicated to the remote target, the number of packets communicated from the remote target, and the number of packets received from the remote target. For example, using the number of packets communicated to the remote target and the number of packets communicated from the remote target, analysis device 12 may determine forward packet loss rate. This holds true, since analysis device 12 can use techniques to ensure that the remote target will respond to all packets received from analysis device 12. Similarly, using the number of packets communicated from the remote target and the number of packets received, analysis device 12 may determine the reverse packet loss rate.

Using the calculated packet loss rates, analysis device 12 determines whether the rates are asymmetric at step 72. For example, analysis device 12 may determine whether the difference between the loss rates exceeds some threshold. If not, analysis device 12 may simply complete operation. However, if asymmetric packet loss rates are detected, analysis device 12 may determine whether the potential misconfiguration has been isolated at step 74. For example, analysis device 12 may determine whether the particular portion of system 10 in which the misconfiguration may exist can be identified with greater granularity. If so, analysis device 12 may attempt to refine the remote target at step 78. For example, analysis device 12 may change the remote target such that only a portion of the previously tested data path is tested. After refining the remote target, analysis device 12 may repeat the previous steps to once again identify a misconfiguration. Once a misconfiguration has been sufficiently isolated, analysis device 12 reports the misconfiguration at step 76. For example, analysis device 12 may generate alarms, send emails, display misconfiguration messages, or perform any other suitable actions to alert administrators to the misconfiguration. Moreover, if misconfigured devices are appropriately enabled, analysis device 12 may further support the automated reconfiguration of network elements to fix the misconfiguration.

Therefore, the preceding flowchart and accompanying description outline the operation of analysis device 12 to analyze a data path to a remote target without requiring knowledge of the analysis procedure within the remote target. However, the flowchart and accompanying description illustrate only an exemplary method of operation, and system 10 contemplates analysis device 12 using any suitable techniques and elements for analyzing a data path to a remote target. Therefore, many of the steps in this flowchart may take place simultaneously and/or in different orders than as shown. In addition, analysis device 12 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for detecting network misconfigurations comprising:
   identifying a remote target;
   transmitting a forward packet series on a data path to the remote target;
   receiving at least some packets from a reverse packet series transmitted on the data path from the remote target;
   determining forward path performance characteristics for transmission of the forward packet series;
   determining reverse path performance characteristics for transmission of the reverse packet series; and
   if the forward path performance characteristics and the reverse path performance characteristics indicate asymmetry on the data path:
      generating an alert signaling a potential network misconfiguration of the data path;
      determining that the data path comprises a plurality of links;
      identifying a second remote target on the data path;
      transmitting a second forward packet series on the portion of the data path to the second remote target;
      receiving at least some packets from a second reverse packet series transmitted on the portion of the data path from the second remote target;
      determining second forward path performance characteristics for transmission of the second forward packet series;
      determining second reverse path performance characteristics for transmission of the second reverse packet series; and
      if the second forward path performance characteristics and the second reverse path performance characteristics indicate asymmetry on the portion of the data path, generating a second alert signaling a second potential network misconfiguration of the portion of the data path.

2. The method of claim 1, wherein the forward path performance characteristics indicate a forward packet loss rate for the forward packet series, and the reverse path performance characteristics indicate a reverse packet loss rate for the reverse packet series.

3. The method of claim 1, wherein the forward path performance characteristics indicate a forward path throughput on the data path, and the reverse path performance characteristics indicate a reverse path throughput on the data path.

4. The method of claim 1, wherein the forward path performance characteristics and the reverse path performance characteristics each comprise a plurality of measurements each indicating performance of the data path for a particular time period.

5. The method of claim 1, further comprising:
   prior to transmitting the forward packet series, transmitting a pre-test packet to the remote target and receiving a pre-test acknowledgment from the remote target;
   after transmitting the forward packet series, transmitting a post-test packet to the remote target and receiving a post-test acknowledgement from the remote target; and
   determining the number of packets within the reverse packet series based upon a comparison of the pre-test acknowledgment and the post-test acknowledgment.

6. The method of claim 5, wherein determining the number of packets within the reverse packet series comprises determining the difference between an internet protocol identifier within the post-test acknowledgment and an internet protocol identifier within the pre-test acknowledgment.

7. The method of claim 1, wherein the remote target is configured to transmit the reverse packet series in response to a test request message, the method further comprising transmitting the test request message to the remote target prior to transmitting the forward packet series.

8. The method of claim 1, further comprising establishing a transmission control protocol (TCP) communication session with the remote target prior to transmitting the forward packet series.

9. The method of claim 8, wherein each packet within the forward packet series comprises a non-sequential TCP packet sequence number.

10. The method of claim 1, wherein each packet within the forward packet series comprises an internet control message protocol (ICMP) echo request message.

11. The method of claim 1, wherein the forward packet series comprises a plurality of packet bursts, each separated by a time constant.

12. The method of claim 11, wherein each of the packet bursts comprises one or more packets separated by a second time constant.

13. The method of claim 1, wherein each packet in the forward packet series has a size of 512 bits.

14. The method of claim 13, wherein the forward packet series is communicated with protocol settings such that each packet in the reverse packet series has size of 512 bits.

15. The method of claim 1, wherein the potential network misconfiguration signaled is an Ethernet duplexity mismatch.

16. An analysis device comprising:
   a network interface operable to couple to a remote target, to transmit a forward packet series on a data path to the remote target, and to receive at least some packets from a reverse packet series transmitted on the data path from the remote target, and if the data path comprises a plurality of links, the network interface further operable to transmit a second forward packet series on the portion of the data path to the second remote target, and to receive at least some packets from a second reverse packet series transmitted on the portion of the data path from the second remote target; and
   a controller operable to determine forward path performance characteristics for transmission of the forward packet series, to determine reverse path performance characteristics for transmission of the reverse packet series, and if the forward path performance characteristics and the reverse path performance characteristics indicate asymmetry on the data path, to generate an alert signaling a potential network misconfiguration of the data path, the controller further operable to determine second forward path performance characteristics for transmission of the second forward packet series, to determine second reverse path performance characteristics for transmission of the second reverse packet series, and if the second forward path performance characteristics and the second reverse path performance characteristics indicate asymmetry on the portion of the data path, to generate a second alert signaling a second potential network misconfiguration of the portion of the data path.

17. The analysis device of claim 16, wherein the forward path performance characteristics indicate a forward packet loss rate for the forward packet series, and the reverse path performance characteristics indicate a reverse packet loss rate for the reverse packet series.

18. The analysis device of claim 16, wherein the forward path performance characteristics indicate a forward path throughput on the data path, and the reverse path performance characteristics indicate a reverse path throughput on the data path.

19. The analysis device of claim 16, wherein the forward path performance characteristics and the reverse path performance characteristics each comprise a plurality of measurements each indicating performance of the data path for a particular time period.

20. The analysis device of claim 16, wherein:
the network interface is further operable, prior to transmitting the forward packet series, to transmit a pre-test packet to the remote target and to receive a pre-test acknowledgment from the remote target, and after transmitting the forward packet series, to transmit a post-test packet to the remote target and to receive a post-test acknowledgement from the remote target; and
the controller is further operable to determine the number of packets within the reverse packet series based upon a comparison of the pre-test acknowledgment and the post-test acknowledgment.

21. The analysis device of claim 20, wherein the controller is further operable to determine the number of packets within the reverse packet series by determining the difference between an internet protocol identifier within the post-test acknowledgment and an internet protocol identifier within the pre-test acknowledgment.

22. The analysis device of claim 16, wherein the remote target is configured to transmit the reverse packet series in response to a test request message, the network interface further operable to transmit the test request message to the remote target prior to transmitting the forward packet series.

23. The analysis device of claim 16, wherein the network interface is further operable to establish a transmission control protocol (TCP) communication session with the remote target prior to transmitting the forward packet series.

24. The analysis device of claim 23, wherein each packet within the forward packet series comprises a non-sequential TCP packet sequence number.

25. The analysis device of claim 16, wherein each packet within the forward packet series comprises an internet control message protocol (ICMP) echo request message.

26. The analysis device of claim 16, wherein the forward packet series comprises a plurality of packet bursts, each separated by a time constant.

27. The analysis device of claim 16, wherein each of the packet bursts comprises one or more packets separated by a second time constant.

28. The analysis device of claim 16, wherein each packet in the forward packet series has a size of 512 bits.

29. The analysis device of claim 28, wherein the forward packet series is communicated with protocol settings such that each packet in the reverse packet series has size of 512 bits.

30. The analysis device of claim 16, wherein the potential network misconfiguration signaled is an Ethernet duplexity mismatch.

31. A computer readable medium encoded with instructions for detecting network misconfigurations, the instructions operable when executed to perform the steps of:
identifying a remote target;
transmitting a forward packet series on a data path to the remote target;
receiving at least some packets from a reverse packet series transmitted on the data path from the remote target;
determining forward path performance characteristics for transmission of the forward packet series;
determining reverse path performance characteristics for transmission of the reverse packet series; and
if the forward path performance characteristics and the reverse path performance characteristics indicate asymmetry on the data path:
generating an alert signaling a potential network misconfiguration of the data path;
determining that the data path comprises a plurality of links;
identifying a second remote target on the data path;
transmitting a second forward packet series on the portion of the data path to the second remote target;
receiving at least some packets from a second reverse packet series transmitted on the portion of the data path from the second remote target;
determining second forward path performance characteristics for transmission of the second forward packet series;
determining second reverse path performance characteristics for transmission of the second reverse packet series; and
if the second forward path performance characteristics and the second reverse path performance characteristics indicate asymmetry on the portion of the data path, generating a second alert signaling a second potential network misconfiguration of the portion of the data path.

32. The computer readable medium of claim 31, wherein the forward path performance characteristics indicate a forward packet loss rate for the forward packet series, and the reverse path performance characteristics indicate a reverse packet loss rate for the reverse packet series.

33. The computer readable medium of claim 31, wherein the forward path performance characteristics indicate a forward path throughput on the data path, and the reverse path performance characteristics indicate a reverse path throughput on the data path.

34. The computer readable medium of claim 31, wherein the forward path performance characteristics and the reverse path performance characteristics each comprise a plurality of measurements each indicating performance of the data path for a particular time period.

35. The computer readable medium of claim 31, the instructions further operable when executed to perform the steps of:
prior to transmitting the forward packet series, transmitting a pre-test packet to the remote target and receiving a pre-test acknowledgment from the remote target;
after transmitting the forward packet series, transmitting a post-test packet to the remote target and receiving a post-test acknowledgement from the remote target; and
determining the number of packets within the reverse packet series based upon a comparison of the pre-test acknowledgment and the post-test acknowledgment.

36. The computer readable medium of claim 35, wherein determining the number of packets within the reverse packet series comprises determining the difference between an internet protocol identifier within the post-test acknowledgment and an internet protocol identifier within the pre-test acknowledgment.

37. The computer readable medium of claim 35, wherein the remote target is configured to transmit the reverse packet series in response to a test request message, the logic further operable when executed to perform the step of transmitting the test request message to the remote target prior to transmitting the forward packet series.

38. The computer readable medium of claim 31, the instructions further operable when executed to perform the step of establishing a transmission control protocol (TCP) communication session with the remote target prior to transmitting the forward packet senes.

39. The computer readable medium of claim 38, wherein each packet within the forward packet series comprises a non-sequential TCP packet sequence number.

40. The computer readable medium of claim 31, wherein each packet within the forward packet series comprises an internet control message protocol (ICMP) echo request message.

41. An analysis device comprising:
means for identifying a remote target;
means for transmitting a forward packet series on a data path to the remote target;
means for receiving at least some packets from a reverse packet series transmitted on the data path from the remote target;
means for determining a forward packet loss rate for the forward packet series;
means for determining a reverse packet loss rate for the reverse packet series; and means for, if the forward packet loss rate and the reverse packet loss rate differ by at least a threshold amount:
generating an alert signaling a potential network misconfiguration of the data path;
determining that the data path comprises a plurality of links;
identifying a second remote target on the data path;
transmitting a second forward packet series on the portion of the data path to the second remote target;
receiving at least some packets from a second reverse packet series transmitted on the portion of the data path from the second remote target;
determining second forward path performance characteristics for transmission of the second forward packet series;
determining second reverse path performance characteristics for transmission of the second reverse packet series; and
if the second forward path performance characteristics and the second reverse path performance characteristics indicate asymmetry on the portion of the data path, generating a second alert signaling a second potential network misconfiguration of the portion of the data path.

* * * * *

UNITED STATES PATENT AND TRADEMARK OFFICE
CERTIFICATE OF CORRECTION

| | |
|---|---|
| PATENT NO. | : 7,385,931 B2 |
| APPLICATION NO. | : 10/646565 |
| DATED | : June 10, 2008 |
| INVENTOR(S) | : Antonio Magnaghi et al. |

Page 1 of 1

It is certified that error appears in the above-identified patent and that said Letters Patent is hereby corrected as shown below:

Col. 15, L. 10: After "forward packet" delete "senes" and insert, --series--.

Signed and Sealed this

Twenty-ninth Day of September, 2009

David J. Kappos
*Director of the United States Patent and Trademark Office*